United States Patent
Gao et al.

(10) Patent No.: US 10,943,178 B1
(45) Date of Patent: Mar. 9, 2021

(54) ACCOUNTING FOR ORGANICALLY OCCURRING INTERACTIONS WITH CONTENT WHEN SELECTING CONTENT ITEMS FOR PRESENSTATION TO USERS OF AN ONLINE SYSTEM

(71) Applicant: Facebook, Inc., Menlo Park, CA (US)

(72) Inventors: Tianshi Gao, Fremont, CA (US); Yifei Zhang, Sunnyvale, CA (US); Sina Jafarpour, Mountain View, CA (US); Satya Satyavarta, Palo Alto, CA (US); Dinkar Jain, Menlo Park, CA (US); Qian Yan, Redwood City, CA (US)

(73) Assignee: Facebook, Inc., Menlo Park, CA (US)

( * ) Notice: Subject to any disclaimer, the term of this patent is extended or adjusted under 35 U.S.C. 154(b) by 622 days.

(21) Appl. No.: 15/885,755

(22) Filed: Jan. 31, 2018

(51) Int. Cl.
| | |
|---|---|
| *G06N 7/00* | (2006.01) |
| *G06Q 50/00* | (2012.01) |
| *G06Q 30/02* | (2012.01) |
| *G06N 20/00* | (2019.01) |
| *H04L 29/08* | (2006.01) |

(52) U.S. Cl.
CPC ............. *G06N 7/005* (2013.01); *G06N 20/00* (2019.01); *G06Q 30/0202* (2013.01); *G06Q 50/01* (2013.01); *H04L 67/10* (2013.01)

(58) Field of Classification Search
CPC ........ G06N 7/005; G06N 20/00; G06N 20/10; G06Q 30/0202; G06Q 50/01; H04L 67/10
See application file for complete search history.

(56) References Cited

U.S. PATENT DOCUMENTS

| | | | | |
|---|---|---|---|---|
| 8,478,697 B2* | 7/2013 | Agarwal | ............ | G06Q 30/0204 705/319 |
| 10,129,367 B2* | 11/2018 | Yan | ........................ | G06F 16/435 |
| 10,419,381 B2* | 9/2019 | Burdakov | ............... | H04L 51/26 |
| 10,678,861 B2* | 6/2020 | Chen | ..................... | H04L 67/306 |
| 2009/0070219 A1* | 3/2009 | D'Angelo | ............. | H04W 4/029 705/14.56 |
| 2010/0257023 A1* | 10/2010 | Kendall | .................. | G06Q 30/02 705/14.46 |
| 2013/0085859 A1* | 4/2013 | Sim | ........................ | G06Q 30/02 705/14.58 |
| 2014/0019261 A1* | 1/2014 | Hegeman | ............... | G06Q 30/02 705/14.71 |

(Continued)

*Primary Examiner* — Amy M Levy
(74) *Attorney, Agent, or Firm* — Fenwick & West LLP

(57) ABSTRACT

An online system maintains one or more models that determine likelihoods of a user performing various interactions after being presented with a content item. Additionally, the online system receives information identifying interactions by users with content, and generates embeddings for various users based on the interactions by the users with content. When determining whether to present a content item including an objective identifying an interaction to a user, the online system applies a maintained model to determine a likelihood of the user performing the interaction identified by the objective after being presented with the content item. Additionally, the online system determines a similarity of the embedding of the user to embeddings of users who performed the interaction identified by the objective. Based on a combination of the likelihood determined by the model and the similarity, the online system determines whether to present the content item to the user.

20 Claims, 3 Drawing Sheets

(56) References Cited

U.S. PATENT DOCUMENTS

| | | | |
|---|---|---|---|
| 2014/0358826 A1* | 12/2014 | Traupman | G06Q 50/01 |
| | | | 706/11 |
| 2017/0017886 A1* | 1/2017 | Gao | G06Q 30/02 |
| 2018/0004847 A1* | 1/2018 | Kulkarni | G06F 16/24578 |
| 2018/0027092 A1* | 1/2018 | Foged | G06N 20/00 |
| | | | 706/12 |
| 2018/0150785 A1* | 5/2018 | Wang | G06N 7/005 |

* cited by examiner

US 10,943,178 B1

ACCOUNTING FOR ORGANICALLY OCCURRING INTERACTIONS WITH CONTENT WHEN SELECTING CONTENT ITEMS FOR PRESENSTATION TO USERS OF AN ONLINE SYSTEM

BACKGROUND

This disclosure relates generally to selecting content to online system users, and more specifically to accounting for interactions performed by users who were not presented with a content item when determining whether or present the content item to other users.

Online systems, such as social networking systems, allow users to connect to and to communicate with other users of the online system. Users may create profiles on an online system that are tied to their identities and include information about the users, such as interests and demographic information. The users may be individuals or entities such as corporations or charities. Online systems allow users to easily communicate and to share content with other online system users by providing content to an online system for presentation to other users. Content provided to an online system by a user may be declarative information provided by a user, status updates, check-ins to locations, images, photographs, videos, text data, or any other information a user wishes to share with additional users of the online system. An online system may also generate content for presentation to a user, such as content describing actions taken by other users on the online system.

Many online systems select content items for presentation to users based on likelihoods of the users performing certain interactions after being presented with the content items. For example, a content item identifies an interaction, and an online system determines a likelihood of the user performing the interaction after being presented with the content item. To determine likelihoods of the user performing interactions after being presented with content items, many online systems train one or more models that are applied to characteristics of users and characteristics of content items.

However, when training one or more models to determine likelihoods of users interactions after being presented with content items, online systems are limited to content items that have been previously presented to users. This often limits the amount of information available to train the one or more models, as different content items are typically presented with different frequencies to users. For example, certain content items are more frequently presented to users by an online system, so one or more models trained by the online system are more heavily influenced by information from presentation of the certain content items. This may prevent the user from accounting for other content items that, while less frequently presented overall, may be more likely to influence certain users to perform one or more interactions.

SUMMARY

An online system receives content items and presents the content items to various users. As the online system presents content items to various users, the online system captures information describing interactions (or actions) by users with the presented content items or after being presented with the content items. For example, the online system receives information identifying a user to whom a content item was presented, identifying the content item, and identifying actions by the user with the content item (e.g., indicating a preference or other reaction to the content item, sharing the content item with another user, commenting on the content item, identifying a complaint with the content item, etc.). As another example, the online system stores information identifying a content item presented to a user, and stores information identifying interactions performed by the user at times after the content item was presented to the user.

Information identifying interactions (or actions) performed by users of the online system is also received from tracking mechanisms included in content by various third party systems or applications, allowing the online system to receive information identifying actions performed by users with content external to the online system. A tracking mechanism included in content comprises instructions that, when executed by a client device, provide information identifying content presented by the client device, information identifying one or more interactions (or actions) with the content, and information identifying a user of the online system associated with the client device to the online system. The online system stores the information identifying the one or more interactions received from a tracking mechanism in association with received information identifying the user of the online system, and may also store the information identifying the content in association with the user of the online system and the information identifying the one or more interactions.

Based on interactions by users with content items presented to the users, the online system generates and maintains an embedding corresponding to each user. The embedding corresponding to a user has multiple dimensions in a latent space. In various embodiments, dimensions of an embedding describe any suitable information about a user corresponding to the embedding. Hence, an embedding corresponding to a user is a high dimensional vector in the latent space describing the user based on information associated with the user by the online system. In various embodiments, dimensions of the embedding are based on one or more interactions with content performed by the user. Various methods may be used by the online system to generate an embedding corresponding to a user in different embodiments.

Additionally, the online system obtains various content items for presentation to users. One or more content items received by the online system include an objective identifying an interaction that a user associated with a content item desires other users to perform when presented with content included in the content item. Example objectives include: installing an application associated with a content item, indicating a preference for a content item, sharing a content item with other users, interacting with an object associated with a content item, accessing content associated with the content item, or performing any other suitable interaction. As content from a content item is presented to online system users, the online system logs interactions between users presented with the content item or with content or other data associated with the content item. In some embodiments, the online system receives compensation from the user associated with a content item including an objective in response to another user to whom the content item was presented performing the interaction identified by the objective of the content item within a time interval after being presented with the content item.

As the online system identifies opportunities to present content items to various users, the online system selects content items for presentation to the users. When the online system identifies an opportunity to present content to a viewing user, the online system applies one or more models to content items maintained by the online system to determine likelihoods of users performing one or more interactions after being presented with various content items. In some embodiments, the online system determines an expected value to the online system of presenting a content item based on a likelihood of a user performing an interaction after being presented with the content item determined from one or more of the models and a value of the interaction to the online system. The one or more models are machine learned models trained on characteristics of content items previously presented to users, characteristics of users, and interactions performed by users to determine a likelihood of a user performing an interaction identified by an objective of a content item when presented with the content item. Because the online system trains the one or more models based on prior interactions with users after being presented with content items, the information used to train the one or more models determining likelihoods of users performing interactions after being presented with content items can be biased towards content items previously selected by one or more selection processes, such as selection processes selecting content based on measures of relevance of content items to users. This limits the information used to train the one or more models to information from users to whom certain, previously-selected, content items were previously presented, which may be limited to a subset of content items available for presentation.

Accordingly, the online system also accounts for obtained information describing interactions performed by users obtained via one or more tracking mechanisms when determining whether to present content items including objectives. As the tracking mechanisms provide information identifying users and identifying interactions by the user even when the user was not presented with one or more content items, leveraging the information describing user interactions allows the online system to account for interactions that users perform. In various embodiments, the online system generates an embedding for content items including an objective identifying an interaction based on embeddings for users who performed the interaction. In some embodiments, the online system totals values of each different dimension of embeddings corresponding to users identified as having performed the interaction and divides the total value of each dimension by a number of users who performed the interaction, with the embedding for the content item including the objective identifying the interaction generated based on the corresponding average value of each dimension. An organic prediction model for the interaction determines a measure of similarity of an embedding of a user to the embedding for the interaction.

The online system identifies an opportunity to present content to the viewing user. To determine whether to present a content item including an objective to the viewing user, the online system applies the one or more models that were trained based on user interactions after prior presentation of various content items to characteristics of the user and to characteristics of the content item and applies an organic prediction model for an interaction identified by the objective to an embedding of the viewing user. The organic prediction model determines a measure of similarity of the embedding of the viewing user to an embedding for the interaction identified by the objective included in the content item. The online system combines the measure of similarity of the embedding of the viewing user to the embedding for the interaction identified by the objective of the content item with a result from the one or more models (e.g., a likelihood of the viewing user performing the interaction identified by the objective of the content item after being presented with the content item, an expected value to the online system of presenting the content item). For example, the online system combines a likelihood of the viewing user performing the interaction identified by the objective of the content item from application of the one or more models with the measure of similarity of the embedding of the viewing user to the embedding for the interaction identified by the objective of the content item. In some embodiments, the online system determines a combined score for the content item including the objective as a sum of a likelihood of the viewing user performing the interaction identified by the objective of the content item from application of the one or more models and the measure of similarity of the embedding of the viewing user to the embedding for the interaction identified by the objective of the content item weighted by a value. In various embodiments, the online system determines the value used to weight the measure of similarity of the embedding of the viewing user to the embedding for the interaction identified by the objective of the content item using one or more trained models.

Hence, when selecting content items for presentation to the viewing user, the online system determines measures of similarity of the embedding of the viewing user to embeddings for interactions identified by objectives of various content items and combines the determined measures of similarity with likelihoods of the viewing user performing the interactions identified by objectives of various content items. In some embodiments, the online system includes the applies one or more selection processes to content items that ranks content items based on their corresponding combinations of likelihoods of the viewing user performing interactions identified by objectives included in various content items and measures of similarity of the embedding of the viewing user to embeddings for interactions identified by objectives included in various content items. The online system selects one or more content items having at least a threshold position in the ranking for presentation to the viewing user via the identified opportunity. Accounting for the measures of similarity between the embedding of the viewing user and the embeddings for interactions identified by objectives of content items allows the online system to leverage information describing interactions performed by users, even when the users are not initially presented with content, to better identify content items more likely to be relevant to the viewing user or more likely to encourage the viewing user to perform an interaction.

The figures depict various embodiments for purposes of illustration only. One skilled in the art will readily recognize from the following discussion that alternative embodiments of the structures and methods illustrated herein may be employed without departing from the principles described herein.

DETAILED DESCRIPTION

System Architecture

Figure 1:
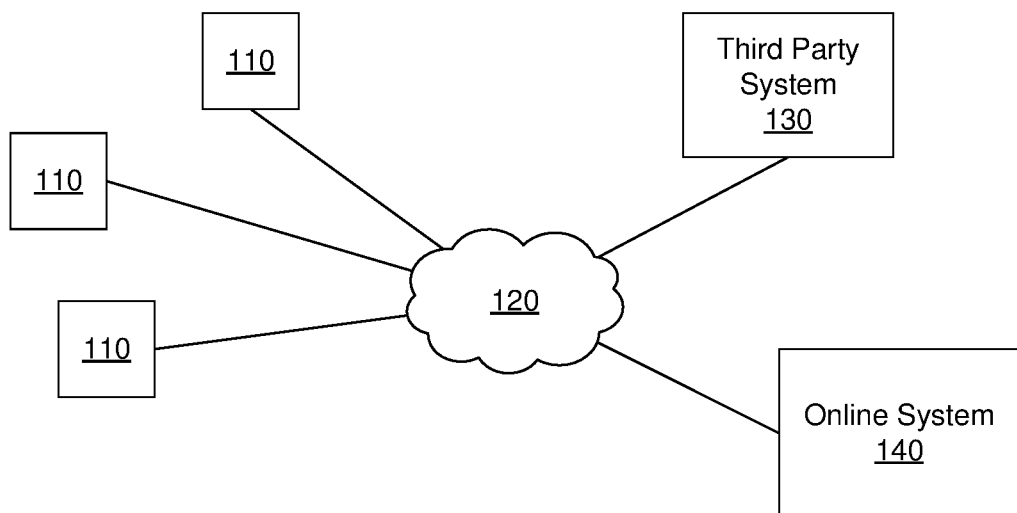
FIG. 1 is a block diagram of a system environment in which an online system operates, in accordance with an embodiment.

FIG. 1 is a block diagram of a system environment 100 for an online system 140. The system environment 100 shown by FIG. 1 comprises one or more client devices 110, a network 120, one or more third-party systems 130, and the online system 140. In alternative configurations, different and/or additional components may be included in the system environment 100. For example, the online system 140 is a social networking system, a content sharing network, or another system providing content to users.

The client devices 110 are one or more computing devices capable of receiving user input as well as transmitting and/or receiving data via the network 120. In one embodiment, a client device 110 is a conventional computer system, such as a desktop or a laptop computer. Alternatively, a client device 110 may be a device having computer functionality, such as a personal digital assistant (PDA), a mobile telephone, a smartphone, or another suitable device. A client device 110 is configured to communicate via the network 120. In one embodiment, a client device 110 executes an application allowing a user of the client device 110 to interact with the online system 140. For example, a client device 110 executes a browser application to enable interaction between the client device 110 and the online system 140 via the network 120. In another embodiment, a client device 110 interacts with the online system 140 through an application programming interface (API) running on a native operating system of the client device 110, such as IOS® or ANDROID™.

The client devices 110 are configured to communicate via the network 120, which may comprise any combination of local area and/or wide area networks, using both wired and/or wireless communication systems. In one embodiment, the network 120 uses standard communications technologies and/or protocols. For example, the network 120 includes communication links using technologies such as Ethernet, 802.11, worldwide interoperability for microwave access (WiMAX), 3G, 4G, code division multiple access (CDMA), digital subscriber line (DSL), etc. Examples of networking protocols used for communicating via the network 120 include multiprotocol label switching (MPLS), transmission control protocol/Internet protocol (TCP/IP), hypertext transport protocol (HTTP), simple mail transfer protocol (SMTP), and file transfer protocol (FTP). Data exchanged over the network 120 may be represented using any suitable format, such as hypertext markup language (HTML) or extensible markup language (XML). In some embodiments, all or some of the communication links of the network 120 may be encrypted using any suitable technique or techniques.

One or more third party systems 130 may be coupled to the network 120 for communicating with the online system 140, which is further described below in conjunction with FIG. 2. In one embodiment, a third party system 130 is an application provider communicating information describing applications for execution by a client device 110 or communicating data to client devices 110 for use by an application executing on the client device. In other embodiments, a third party system 130 provides content or other information for presentation via a client device 110. A third party system 130 may also communicate information to the online system 140, such as advertisements, content, or information about an application provided by the third party system 130.

Figure 2:
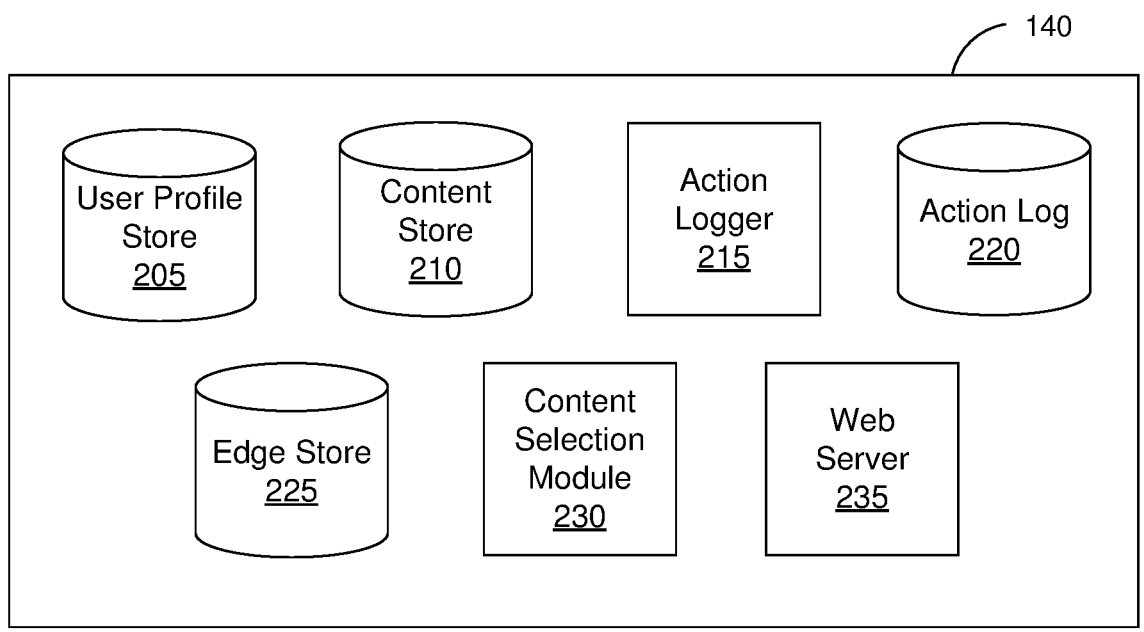
FIG. 2 is a block diagram of an online system, in accordance with an embodiment.

FIG. 2 is a block diagram of an architecture of the online system 140. The online system 140 shown in FIG. 2 includes a user profile store 205, a content store 210, an action logger 215, an action log 220, an edge store 225, a content selection module 230, and a web server 235. In other embodiments, the online system 140 may include additional, fewer, or different components for various applications. Conventional components such as network interfaces, security functions, load balancers, failover servers, management and network operations consoles, and the like are not shown so as to not obscure the details of the system architecture.

Each user of the online system 140 is associated with a user profile, which is stored in the user profile store 205. A user profile includes declarative information about the user that was explicitly shared by the user and may also include profile information inferred by the online system 140. In one embodiment, a user profile includes multiple data fields, each describing one or more attributes of the corresponding online system user. Examples of information stored in a user profile include biographic, demographic, and other types of descriptive information, such as work experience, educational history, gender, hobbies or preferences, location and the like. A user profile may also store other information provided by the user, for example, images or videos. In certain embodiments, images of users may be tagged with information identifying the online system users displayed in an image, with information identifying the images in which a user is tagged stored in the user profile of the user. A user profile in the user profile store 205 may also maintain references to actions by the corresponding user performed on content items in the content store 210 and stored in the action log 220.

While user profiles in the user profile store 205 are frequently associated with individuals, allowing individuals to interact with each other via the online system 140, user profiles may also be stored for entities such as businesses or organizations. This allows an entity to establish a presence on the online system 140 for connecting and exchanging content with other online system users. The entity may post information about itself, about its products or provide other information to users of the online system 140 using a brand page associated with the entity's user profile. Other users of the online system 140 may connect to the brand page to receive information posted to the brand page or to receive information from the brand page. A user profile associated with the brand page may include information about the entity itself, providing users with background or informational data about the entity.

The content store 210 stores objects that each represent various types of content. Examples of content represented by an object include a page post, a status update, a photograph, a video, a link, a shared content item, a gaming application achievement, a check-in event at a local business, a brand page, or any other type of content. Online system users may create objects stored by the content store 210, such as status updates, photos tagged by users to be associated with other objects in the online system 140, events, groups or applications. In some embodiments, objects are received from third-party applications or third-party applications separate from the online system 140. In one embodiment, objects in the content store 210 represent single pieces of content, or content "items." Hence, online system users are encouraged to communicate with each other by posting text and content items of various types of media to the online system 140 through various communication channels. This increases the amount of interaction of users with each other and increases the frequency with which users interact within the online system 140.

One or more content items included in the content store 210 include a creative, which is content for presentation to a user, and a bid amount. The creative is text, image, audio, video, or any other suitable data presented to a user. In various embodiments, the creative also specifies a page of content. For example, a content item includes a link that specifying a network address of a landing page of content to which a user is directed when the content item is accessed. If a user presented with the content The bid amount is included in a content item by a user and is used to determine an expected value, such as monetary compensation, provided by an advertiser to the online system 140 if content in the content item is presented to a user, if the content in the content item receives a user interaction when presented, or if any suitable condition is satisfied when content in the content item is presented to a user. For example, the bid amount included in a content item specifies a monetary amount that the online system 140 receives from a user who provided the content item to the online system 140 if content in the content item is displayed. In some embodiments, the expected value to the online system 140 of presenting the content from the content item may be determined by multiplying the bid amount by a probability of the content of the content item being accessed by a user.

Various content items may include an objective identifying an interaction that a user associated with a content item desires other users to perform when presented with content included in the content item. Example objectives include: installing an application associated with a content item, indicating a preference for a content item, sharing a content item with other users, interacting with an object associated with a content item, or performing any other suitable interaction. As content from a content item is presented to online system users, the online system 140 logs interactions between users presented with the content item or with objects associated with the content item. Additionally, the online system 140 receives compensation from a user associated with content item as online system users perform interactions with a content item that satisfy the objective included in the content item.

Additionally, a content item may include one or more targeting criteria specified by the user who provided the content item to the online system 140. Targeting criteria included in a content item request specify one or more characteristics of users eligible to be presented with the content item. For example, targeting criteria are used to identify users having user profile information, edges, or actions satisfying at least one of the targeting criteria. Hence, targeting criteria allow a user to identify users having specific characteristics, simplifying subsequent distribution of content to different users.

In one embodiment, targeting criteria may specify actions or types of connections between a user and another user or object of the online system 140. Targeting criteria may also specify interactions between a user and objects performed external to the online system 140, such as on a third party system 130. For example, targeting criteria identifies users that have taken a particular action, such as sent a message to another user, used an application, joined a group, left a group, joined an event, generated an event description, purchased or reviewed a product or service using an online marketplace, requested information from a third party system 130, installed an application, or performed any other suitable action. Including actions in targeting criteria allows users to further refine users eligible to be presented with content items. As another example, targeting criteria identifies users having a connection to another user or object or having a particular type of connection to another user or object.

The action logger 215 receives communications about user actions internal to and/or external to the online system 140, populating the action log 220 with information about user actions. Examples of actions include adding a connection to another user, sending a message to another user, uploading an image, reading a message from another user, viewing content associated with another user, and attending an event posted by another user. In addition, a number of actions may involve an object and one or more particular users, so these actions are associated with the particular users as well and stored in the action log 220.

The action log 220 may be used by the online system 140 to track user actions on the online system 140, as well as actions on third party systems 130 that communicate information to the online system 140. Users may interact with various objects on the online system 140, and information describing these interactions is stored in the action log 220. Examples of interactions with objects include: commenting on posts, sharing links, checking-in to physical locations via a client device 110, accessing content items, and any other suitable interactions. Additional examples of interactions with objects on the online system 140 that are included in the action log 220 include: commenting on a photo album, communicating with a user, establishing a connection with an object, joining an event, joining a group, creating an event, authorizing an application, using an application, expressing a preference for an object ("liking" the object), and engaging in a transaction. Additionally, the action log 220 may record a user's interactions with advertisements on the online system 140 as well as with other applications operating on the online system 140. In some embodiments, data from the action log 220 is used to infer interests or preferences of a user, augmenting the interests included in the user's user profile and allowing a more complete understanding of user preferences.

The action log 220 may also store user actions taken on a third party system 130, such as an external website, and communicated to the online system 140. For example, an e-commerce website may recognize a user of an online system 140 through a social plug-in enabling the e-commerce website to identify the user of the online system 140. Because users of the online system 140 are uniquely identifiable, e-commerce web sites, such as in the preceding example, may communicate information about a user's actions outside of the online system 140 to the online system 140 for association with the user. Hence, the action log 220 may record information about actions users perform on a third party system 130, including webpage viewing histories, advertisements that were engaged, purchases made, and other patterns from shopping and buying. Additionally, actions a user performs via an application associated with a third party system 130 and executing on a client device 110 may be communicated to the action logger 215 by the application for recordation and association with the user in the action log 220.

The action logger 215 may also generate embeddings for various users based on interactions performed by users with content presented external to the online system 140 (e.g., via a third party system 130 or an application executing on a client device 110). For example, the action logger 215 retrieves interactions with content by a user from the action log 220 and generates an embedding for the user based on different interactions associated with the user retrieved from the action log 220. As further described below in conjunction with FIG. 3, the embedding for the user includes multiple dimensions that each correspond to a different interaction with content presented to the user or other information about the user. Any suitable method may be used by the action logger 215 to generate and modify the embedding in various embodiments. The embedding for a user is stored in association with the user. For example, the embedding for a user is stored in a user profile for the user in the user profile store 205. Additionally, as further described below in conjunction with FIG. 3, the action logger 215 generates embeddings for one or more content items including objectives identifying interactions based on embeddings of users who performed the interactions. An embedding for a content item including an objective identifying an interaction is stored in the action log 220 in association with the content item including the objective identifying the interaction in various embodiments; alternatively, the embedding for the content item including the objective identifying the interaction is stored in the content store 210 in association with the content item.

In one embodiment, the edge store 225 stores information describing connections between users and other objects on the online system 140 as edges. Some edges may be defined by users, allowing users to specify their relationships with other users. For example, users may generate edges with other users that parallel the users' real-life relationships, such as friends, co-workers, partners, and so forth. Other edges are generated when users interact with objects in the online system 140, such as expressing interest in a page on the online system 140, sharing a link with other users of the online system 140, and commenting on posts made by other users of the online system 140.

An edge may include various features each representing characteristics of interactions between users, interactions between users and objects, or interactions between objects. For example, features included in an edge describe a rate of interaction between two users, how recently two users have interacted with each other, a rate or an amount of information retrieved by one user about an object, or numbers and types of comments posted by a user about an object. The features may also represent information describing a particular object or user. For example, a feature may represent the level of interest that a user has in a particular topic, the rate at which the user logs into the online system 140, or information describing demographic information about the user. Each feature may be associated with a source object or user, a target object or user, and a feature value. A feature may be specified as an expression based on values describing the source object or user, the target object or user, or interactions between the source object or user and target object or user; hence, an edge may be represented as one or more feature expressions.

The edge store 225 also stores information about edges, such as affinity scores for objects, interests, and other users. Affinity scores, or "affinities," may be computed by the online system 140 over time to approximate a user's interest in an object or in another user in the online system 140 based on the actions performed by the user. A user's affinity may be computed by the online system 140 over time to approximate the user's interest in an object, in a topic, or in another user in the online system 140 based on actions performed by the user. Computation of affinity is further described in U.S. patent application Ser. No. 12/978,265, filed on Dec. 23, 2010, U.S. patent application Ser. No. 13/690,254, filed on Nov. 30, 2012, U.S. patent application Ser. No. 13/689,969, filed on Nov. 30, 2012, and U.S. patent application Ser. No. 13/690,088, filed on Nov. 30, 2012, each of which is hereby incorporated by reference in its entirety. Multiple interactions between a user and a specific object may be stored as a single edge in the edge store 225, in one embodiment. Alternatively, each interaction between a user and a specific object is stored as a separate edge. In some embodiments, connections between users may be stored in the user profile store 205, or the user profile store 205 may access the edge store 225 to determine connections between users.

The content selection module 230 selects one or more content items for communication to a client device 110 to be presented to a user. Content items eligible for presentation to the user are retrieved from the content store 210 or from another source by the content selection module 230, which selects one or more of the content items for presentation to the viewing user. A content item eligible for presentation to the user is a content item associated with at least a threshold number of targeting criteria satisfied by characteristics of the user or is a content item that is not associated with targeting criteria. In various embodiments, the content selection module 230 includes content items eligible for presentation to the user in one or more selection processes, which identify a set of content items for presentation to the user. For example, the content selection module 230 includes one or more models that determine measures of relevance of various content items to the user based on characteristics of the user by the online system 140 and based on the user's affinity for different content items. A measure of relevance of a content item to the user is based on a measure of quality of the content item for the user, which may be based on the content presented by the content item. Based on the measures of relevance, the content selection module 230 selects content items for presentation to the user. As an additional example, the content selection module 230 selects content items having the highest measures of relevance or having at least a threshold measure of relevance for presentation to the user. Alternatively, the content selection module 230 ranks content items based on their associated measures of relevance and selects content items having the highest positions in the ranking or having at least a threshold position in the ranking for presentation to the user. In other embodiments, one or more models maintained by the content selection module 230 determine likelihoods of a user performing different interactions after being presented with the content item based on characteristics of content items and characteristics of the user. Based on the likelihoods of the user performing one or more interactions after being presented with content items, the content selection module 230 selects one or more content items for presentation to user.

Content items eligible for presentation to the user may include content items associated with bid amounts. The content selection module 230 uses the bid amounts associated with content items when selecting content for presentation to the user. In various embodiments, the content selection module 230 determines an expected value associated with various content items based on their bid amounts and selects content items associated with a maximum expected value or associated with at least a threshold expected value for presentation. An expected value associated with a content item represents an expected amount of compensation to the online system 140 for presenting the content item. For example, the expected value associated with a content item is a product of the content item's bid amount and a likelihood of the user interacting with the content item, determined by application of one or more models to characteristics of the content item and of the user. The content selection module 230 may rank content items based on their associated bid amounts and select content items having at least a threshold position in the ranking for presentation to the user. In some embodiments, the content selection module 230 ranks both content items not associated with bid amounts and content items associated with bid amounts in a unified ranking based on bid amounts and measures of relevance associated with content items. Based on the unified ranking, the content selection module 230 selects content for presentation to the user. Selecting content items associated with bid amounts and content items not associated with bid amounts through a unified ranking is further described in U.S. patent application Ser. No. 13/545, 266, filed on Jul. 10, 2012, which is hereby incorporated by reference in its entirety.

For example, the content selection module 230 receives a request to present a feed of content to a user of the online system 140. The feed includes content items such as stories describing actions associated with other online system users connected to the user. The content selection module 230 accesses one or more of the user profile store 205, the content store 210, the action log 220, and the edge store 225 to retrieve information about the user. For example, information describing actions associated with other users connected to the user or other data associated with users connected to the user are retrieved. Content items from the content store 210 are retrieved and analyzed by the content selection module 230 to identify candidate content items eligible for presentation to the user. For example, content items associated with users who not connected to the user or stories associated with users for whom the user has less than a threshold affinity are discarded as candidate content items. Based on various criteria, the content selection module 230 selects one or more of the content items identified as candidate content items for presentation to the identified user. The selected content items are included in a feed of content that is presented to the user. For example, the feed of content includes at least a threshold number of content items describing actions associated with users connected to the user via the online system 140.

The content selection module 230 may also account for interactions by users when selecting content for presentation to a user. As further described below in conjunction with FIGS. 3 and 4, the content selection module 230 accounts for interactions with content by users, regardless of whether the user was previously presented with one or more content items, by retrieving an embedding for a user from the user profile 205 and embeddings for interactions identified by objectives included in various content items. The content selection module 230 determines measures of similarity between the embedding of the user and embeddings for interactions identified by objectives in various content items. As further described below in conjunction with FIGS. 3 and 4, the content selection module 230 combines a likelihood of a user performing an interaction identified by an objective included in a content item with a measure of similarity of the embedding of the user to the embedding for the interaction identified by the objective included in the content item. The content selection module 230 uses the combination of likelihood of a user performing an interaction identified by an objective included in a content item with a measure of similarity of the embedding of the user to the embedding for the interaction included in the content item when determining wither to present the content item to the user.

The web server 235 links the online system 140 via the network 120 to the one or more client devices 110, as well as to the one or more third party systems 130. The web server 235 serves web pages, as well as other content, such as JAVA®, FLASH®, XML and so forth. The web server 235 may receive and route messages between the online system 140 and the client device 110, for example, instant messages, queued messages (e.g., email), text messages, short message service (SMS) messages, or messages sent using any other suitable messaging technique. A user may send a request to the web server 235 to upload information (e.g., images or videos) that are stored in the content store 210. Additionally, the web server 235 may provide application programming interface (API) functionality to send data directly to native client device operating systems, such as IOS®, ANDROID™, or BlackberryOS.

Figure 3:
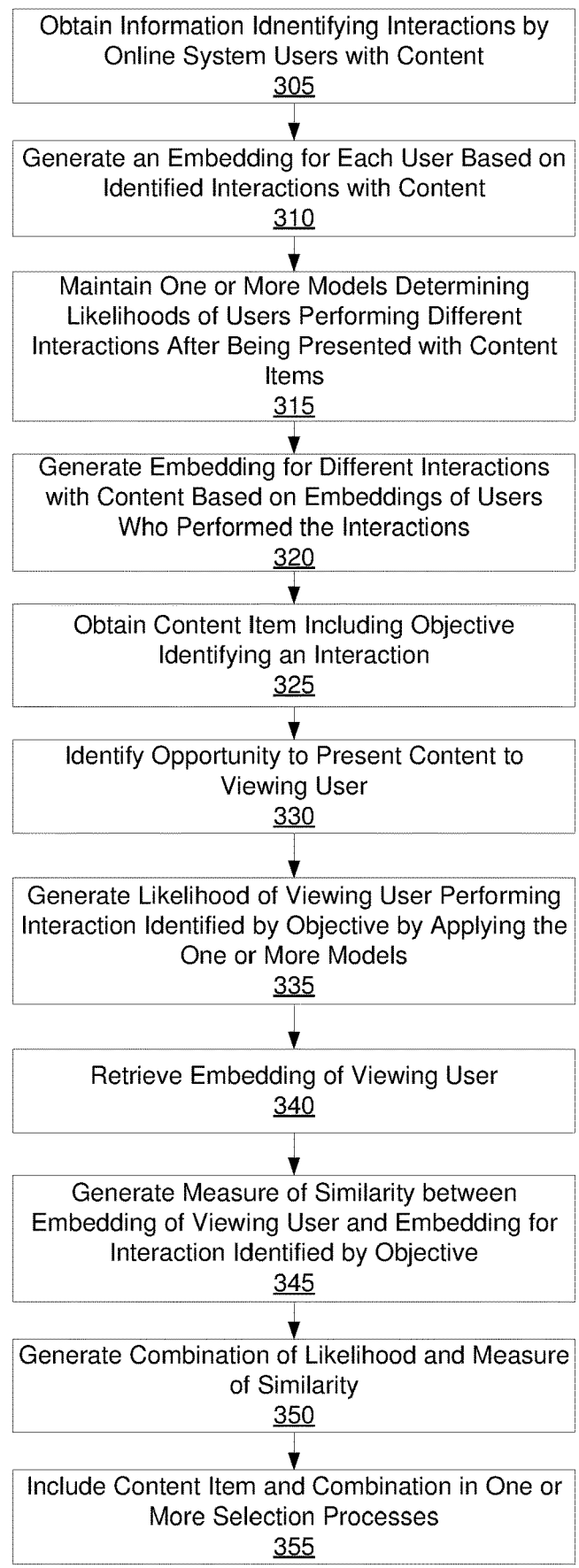
FIG. 3 is a flowchart of a method for an online system to select content for presentation to a viewing user while accounting for user interactions with content without previously being presented with content items, in accordance with an embodiment.

Selecting Content for a User Accounting for Organic User Interactions with Content FIG. 3 is a flowchart of one embodiment of a method for an online system 140 selecting content for presentation to a viewing user while accounting for user interactions with content without previously being presented with content items. In various embodiments, the steps described in conjunction with FIG. 3 may be performed in different orders. Additionally, in some embodiments, the method may include different and/or additional steps than those shown in FIG. 3.

As the online system 140 presents content items to various users, the online system 140 captures information describing interactions (or actions) by the users with the presented content items or after being presented with the content items. When the online system 140 presents a content item to users, the online system 140 receives information describing actions by various users with the presented content item. For example, the online system 140 receives information identifying a user to whom a content item was presented, identifying the content item, and identifying actions by the user with the content item (e.g., indicating a preference or other reaction to the content item, sharing the content item with another user, commenting on the content item, identifying a complaint with the content item, etc.). The online system 140 stores the identified actions in association with the user and with the content item, allowing the online system 140 to log user interactions with content items, as further described above in conjunction with FIG. 2.

Additionally, the online system 140 obtains 305 information identifying interactions (or actions) performed by users of the online system 140 from tracking mechanisms included in content by various third party systems 130 or applications regardless of whether the online system 140 has previously presented content to users. This allows the online system 140 to obtain 305 information identifying actions performed by users with content external to the online system 140 that occurs regardless of whether the users were presented with content by the online system 140. A tracking mechanism (e.g., a tracking pixel) included in content comprises instructions that, when executed by a client device 110, provide information identifying content presented by the client device, information identifying one or more interactions (or actions) with the content, and information identifying a user of the online system 140 associated with the client device 110 to the online system 140. The online system 140 stores the information identifying the one or more interactions received from a tracking mechanism in association with received information identifying the user of the online system 140, and may also store the information identifying the content in association with the user of the online system and the information identifying the one or more interactions.

Based on the obtained information identifying interactions by users with content, the online system 140 generates 310 an embedding of each user and maintains the embeddings in association with their corresponding users. The embedding of to a user has multiple dimensions, with different dimensions corresponding to information about the user. For example, dimensions of an embedding describe interactions with content performed by the user, while other dimensions of the embedding describe characteristics of the user. However, in various embodiments, dimensions of an embedding represent any suitable information about a user corresponding to the embedding. Hence, an embedding corresponding to a user is a high dimensional vector in a latent space describing the user based on information associated with the user by the online system 140, including interactions by the user with content. Various methods may be used by the online system 140 to generate an embedding corresponding to a user in different embodiments, with the online system 140 maintaining the embeddings in association with their corresponding users. For example, the online system 140 includes an embedding corresponding to a user in a user profile maintained by the online system 140 for the user.

Additionally, based on interactions performed by various users after content items were presented to the users by the online system 140, the online system 140 maintains 315 one or more models that determine likelihoods of users performing different interactions after being presented with content items. For example, the online system 140 generates a model determining a likelihood of a user performing an interaction after being presented with a content item based on characteristics of content items presented to users identified to the online system 140 as having performed the interaction within a threshold time interval after being presented with one or more of the content items by the online system 140 and characteristics of the users identified as having performed the interaction within a threshold time interval after being presented with one or more of the content items by the online system 140. The online system 140 may use any suitable method or method to generate the one or more models. As the online system 140 receives information identifying interactions performed by users to whom content items were presented, the online system 140 modifies one or more of the maintained models. In some embodiments, the online system 140 maintains a different model for different interactions. As the one or more models are based on characteristics of content items that were presented to users, the models may lack information about characteristics of certain content items that have not been presented to users or that are infrequently presented to users.

In addition to maintaining 315 the one or more models, the online system 140 generates 320 an embedding for to each of one or more content items including an objective identifying an interaction based on interactions with content based on the obtained 305 information identifying interactions with content and users who performed the identified interactions. To generate 320 an embedding for a content item including an objective identifying an interaction, the online system 140 retrieves embeddings of users identified by information obtained 305 from one or more tracking mechanisms as having performed the interaction and generates 320 the embedding for the content item including the objective identifying the interaction from the retrieved embeddings of users. For example, the online system 140 totals values of each different dimensions of retrieved embeddings of users identified as having performed the interaction and divides the total value of each dimension by a number of users identified has having performed the interaction, so the embedding for the content item including the objective identifying the interaction is generated 320 based on the corresponding average value of each dimension. Hence, in some embodiments, an embedding for a content item including an objective identifying an interaction has multiple dimensions that each have a value corresponding to an average value of the dimension in embeddings corresponding to users identified as having performed the interaction.

The online system 140 obtains 325 a content item that includes content for presentation to users of the online system 140 and an objective. Any suitable content may be included in the content item for presentation. For example, the content item includes video data for presentation to users of the online system. As further described above in conjunction with FIG. 2, the objective identifies an interaction that a publishing user associated with the content item desires other users to perform when presented with content included in the content item. Example objectives include: installing an application associated with the content item, indicating the preference for a content item, sharing the content item with other users, interacting with an object associated with the content item, or performing any other suitable interaction.

In some embodiments, the content item also includes a bid amount. As further described above in conjunction with FIG. 2, the bid amount is used to determine an expected value, such as monetary compensation, provided by the publishing user to the online system 140 if content in the content item is presented to a user, if the content in the content item receives a user interaction when presented, or if any suitable condition is satisfied when content in the content item is presented to a user. For example, the bid amount included in the content item specifies a monetary amount that the online system 140 receives from the publishing if content in the content item is displayed or if a user performs the interaction identified by the objective after being presented with the content item.

When the online system 140 identifies 330 an opportunity to present content to a viewing user, the online system 140 applies one or more of the maintained models to characteristics of the viewing user maintained by the online system 140 and to the content item to generate 335 a likelihood of the viewing user performing the interaction identified by the objective of the content item. If the content item includes a bid amount, application of one or more of the maintained models generates 335 an expected value to the online system 140 of presenting the content item to the viewing user. For example, applying a maintained model to the content item generates 335 an expected value to the online system 140 that is a product of a bid amount included in the content item and a likelihood of the viewing user performing the interaction identified by the objective of the content item after being presented with the content item.

However, because the one or more maintained models are based on prior interactions by users after being presented with content items by the online system 140, the one or more models may be biased towards information from presentation of certain content items to online system users. For example, one or more selection processes used by the online system 140 may select certain content items for presentation more frequently than other content items, limiting the amount of information available to the online system 140 to accurately determine a likelihood of users performing interactions after being presented with the less frequently presented content items. This potential limitation in data used to train one or more of the models may reduce likelihoods of certain content items that have been infrequently presented to users being selected for presentation to the viewing user, despite the viewing user being likely to perform interactions corresponding to objectives included in the certain content items.

To offset this potential bias from training of the one or more models, the online system 140 retrieves 340 an embedding of the viewing user and generates 345 a measure of similarity of the embedding of the viewing user to an embedding for the content item including the objective identifying the interaction. In various embodiments, the online system 140 uses any suitable method to generate 345 the measure of similarity of the embedding of the viewing user and the embedding for the content item including the objective identifying the interaction. For example, the online system 140 generates 345 a cosine similarity between the embedding of the viewing user and the embedding for the content item including the objective identifying the interaction. Alternatively, the online system 140 generates 345 a distance (e.g., a Euclidean distance) between the embedding of the viewing user and the embedding for the content item including the objective identifying the interaction. However, in other embodiments, the online system 140 generates 345 the measure of similarity between the embedding of the viewing user and the embedding for the content item including the objective identifying the interaction using any suitable method or methods. The generated measure of similarity specifies a similarity between the viewing user and users who previously performed the interaction identified by the objective included in the content item, which accounts for users who performed the interaction identified by the objective included in the content item without previously being presented with content items having an objective identifying the interaction.

The online system 140 generates 350 a combination of the likelihood of the viewing user performing the interaction identified by the objective included in the content item after being presented with the content item (or the expected value to the online system 140 of presenting the content item to the viewing user) and the determined measure of similarity between the embedding of the viewing user and the embedding for the content item including the objective identifying the interaction. In various embodiments, the online system 140 generates 350 the combination as a sum of the likelihood of the viewing user performing the interaction identified by the objective included in the content item after being presented with the content item (or the expected value to the online system 140 of presenting the content item to the viewing user) and the determined measure of similarity between the embedding of the viewing user and the content item including the objective identifying the interaction. The online system 140 may apply a weight to the measure of similarity between the embedding of the viewing user and the embedding for the content item including the objective identifying the interaction and generate 350 the combination as a sum of the weighted measure of similarity between the embedding of the viewing user and the embedding for the content item including the objective identifying the interaction and the likelihood of the viewing user performing the interaction identified by the objective included in the content item after being presented with the content item (or the expected value to the online system 140 of presenting the content item to the viewing user). In various embodiments, the online system 140 determines the weight applied to the measure of similarity between the embedding of the viewing user and the embedding for the content item including the objective identifying the interaction using any suitable method or methods. For example, the online system 140 trains a weighting model to determine the weight applied to the measure of similarity between the embedding of the viewing user and the embedding for the content item including the objective identifying the interaction. The weighting model may determine the weight across multiple content items including objectives so the combination of determine likelihoods of the viewing user (or viewing users) performing interactions identified by objectives included in content items after being presented with the content items and measures of similarity between embeddings of viewing users and embeddings for content items including objectives identifying interactions is maximized; for example, the online system 140 determines the weight through regression analysis based on likelihoods of the viewing user (or viewing users) performing interactions identified by objectives included in content items after being presented with the content items and measures of similarity between embeddings of viewing users and embeddings for content items including objectives identifying interactions. Alternatively, the online system 140 generates 350 the combination by modifying a model determining the likelihood of the viewing user performing the interaction identified by the objective included in the content item after being presented with the content item (or the expected value to the online system 140 of presenting the content item to the viewing user) to include the determined measure of similarity between the embedding of the viewing user and the embedding for the content item including the objective identifying the interaction as an input.

Subsequently, the online system 140 includes 355 the content item and the combination of the likelihood of the viewing user performing the interaction identified by the objective included in the content item (or expected value to the online system 140 of presenting the content item) and measure of similarity between the embedding of the viewing user and the content item including the objective identifying the interaction in one or more selection processes, which select content for presentation to the viewing user via the identified opportunity. In various embodiments, a selection process selects content items associated with likelihoods of the viewing user performing interactions identified by objectives included in content items (or expected values to the online system 140 of presenting content items accounting for bid amounts included in content items), or associated with combinations of likelihoods of the viewing user performing the interaction identified by the objective included in the content item (or expected value to the online system 140 of presenting the content item) and measures of similarity between the embedding of the viewing user and embeddings for content items including objectives identifying interactions, that equal or exceed a threshold. Alternatively, a selection process selects ranks content items based on likelihoods of the viewing user performing interactions identified by objectives included in content items (or expected values to the online system 140 of presenting content items that accounts for bid amounts of the content items) or based on combinations of likelihoods of the viewing user performing the interaction identified by the objective included in the content item (or expected value to the online system 140 of presenting the content item) and measures of similarity between the embedding of the viewing user and embeddings for content items including objectives identifying interactions. The selection process selects content items having at least a threshold position in the ranking for presentation to the viewing user. Content items selected by the one or more selection processes are transmitted from the online system 140 to a client device 110 associated with the viewing user for presentation to the viewing user.

Figure 4:
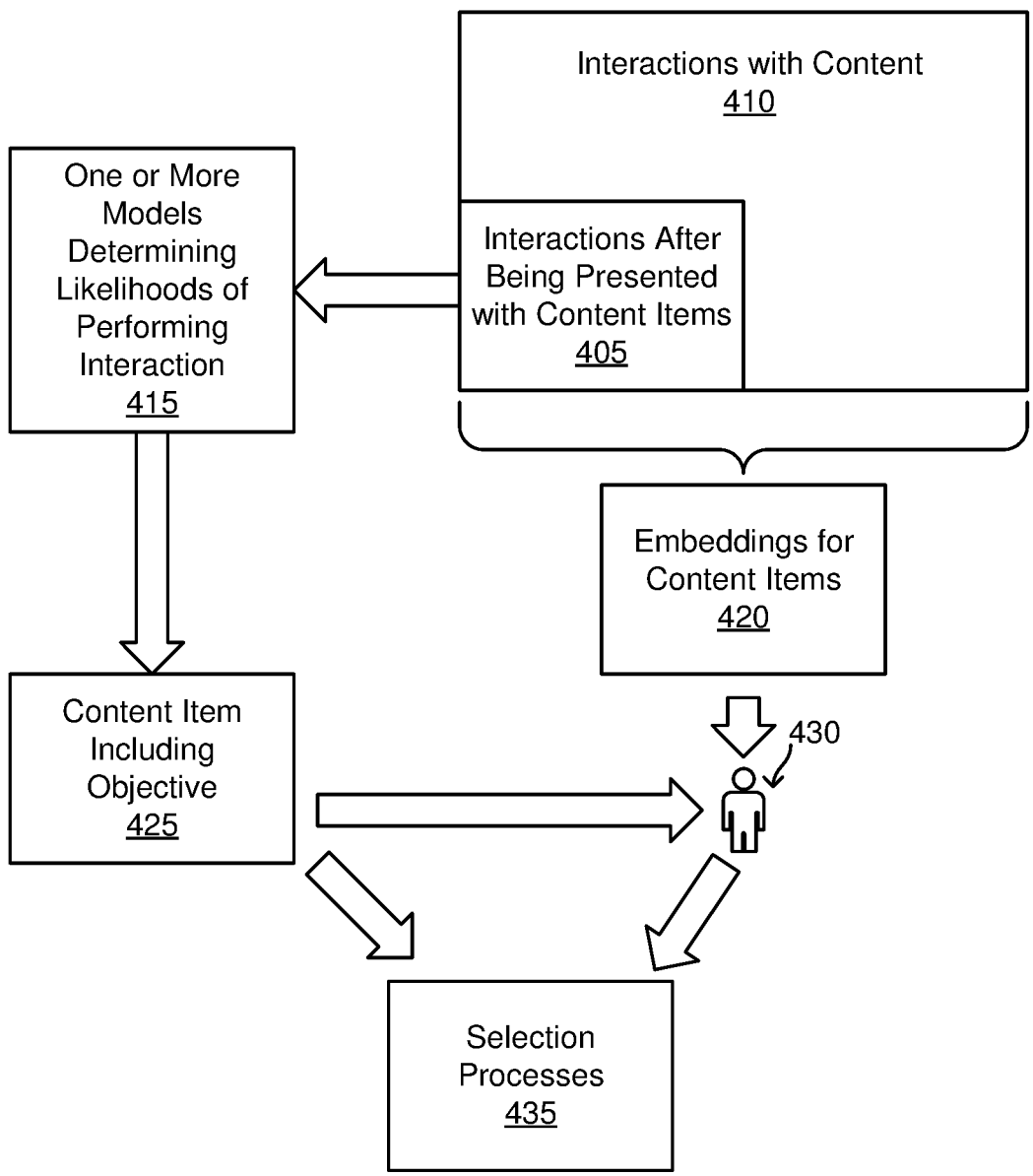
FIG. 4 is a process flow diagram of an online system selecting content for presentation to a viewing user while accounting for user interactions with content without previously being presented with content items, in accordance with an embodiment.

FIG. 4 is a process flow diagram of an online system 140 selecting content for presentation to a viewing user while accounting for user interactions with content without previously being presented with content items. The online system 140 presents content items to various users and captures information describing interactions 405 by the users with the presented content items or after being presented with the content items, as further described above in conjunction with FIG. 3. Additionally, as users interact with content external to the online system 140, such as content presented by third party systems 130 or applications executing on client devices 110, the online system 140 obtains information identifying the interactions 410 and users who performed the interactions. For example, a tracking mechanism (e.g., a tracking pixel) included in content provides provide information identifying content presented by a client device 110, information identifying one or more interactions (or actions) with the content, and information identifying a user of the online system 140 associated with the client device 110 to the online system 140. Hence, the online system 140 obtains information identifying interactions with content by various users when the users are not presented with content items by the online system, as well as information identifying interactions users perform within a threshold time interval after being presented with content items by the online system 140.

From the interactions 405 by users with content after being presented with content items by the online system 140, the online system 140 generates and maintains one or more models 415 determining likelihoods of users performing one or more interactions with content after being presented with one or more content items. In various embodiments, a model 415 is trained based on characteristics of content items presented to users who subsequently performed an interaction and characteristics of users who performed the interaction. The online system 140 maintains the one or more models 415, and modifies the models 415 as users perform interactions after being presented with content items by the online system 140.

Additionally, the online system 140 generates an embedding 420 for to each of one or more content items including objectives identifying interactions with content based on the interactions 405 with content by users, regardless of whether users who performed the interactions 405 were previously presented with one or more content items. To generate an embedding 420 for a content item including an objective identifying an interaction, the online system 140 retrieves embeddings of users identified as having performed the interaction from information obtained by the online system 140 and generates the embedding 420 for the a content item including an objective identifying an interaction from the retrieved embeddings of users, as further described above in conjunction with FIG. 2. As embeddings of users are high dimensional vectors in a latent space describing the user based on information associated with the user by the online system 140, including interactions by the user with content, the embedding 420 for a content item including an objective identifying an interaction is a high dimensional vector describing users who performed the interaction.

The online system 140 obtains a content item 425 that includes content for presentation to users of the online system 140 and an objective. As further described above in conjunction with FIGS. 2 and 3, the objective identifies an interaction that a publishing user associated with the content item 425 desires other users to perform when presented with content included in the content item. Example objectives include: installing an application associated with the content item, indicating the preference for a content item, sharing the content item with other users, interacting with an object associated with the content item, or performing any other suitable interaction.

When the online system 140 identifies an opportunity to present content to a viewing user 430, the online system 140 retrieves an embedding of the viewing user 430. The online system 140 also applies one or more of the maintained models 415 to characteristics of the viewing user 430 maintained by the online system 140 and to the content item 425 to generate a likelihood of the viewing user performing the interaction identified by the objective of the content item 425 or an expected value to the online system 140 of presenting the content item 425 to the viewing user 430.

However, because the one or more maintained models 415 are based on prior interactions by users after being presented with content items by the online system 140, the one or more models 415 may be biased towards information from presentation of certain content items to online system users. As the one or more models 415 are limited to being generated and maintained based on content items selected for presentation to users, content items more frequently presented to users more heavily influence the one or more models 415. This potential limitation in data used to train one or more of the models 415 reduces likelihoods of the models 415 accurately determining likelihoods of users performing interactions after being presented with certain content items that have been infrequently presented to online system users.

To offset this potential bias from training of the one or more models, the online system 140 generates a measure of similarity of the embedding of the viewing user 430 to an embedding 420 for the content item 425 including the objective identifying the interaction, as further described above in conjunction with FIG. 3. This measure of similarity specifies a similarity between the viewing user 430 and users who previously performed the interaction identified by the objective included in the content item 425, which accounts for users who performed the interaction identified by the objective included in the content item 425 without previously being presented with content items having an objective identifying the interaction. The online system 140 generates a combination of the likelihood of the viewing user 430 performing the interaction identified by the objective included in the content item 425 after being presented with the content item 425 (or the expected value to the online system 140 of presenting the content item 425 to the viewing user 430) and the determined measure of similarity between the embedding of the viewing user 430 and the embedding 420 for the content item 425 including the objective identifying the interaction, as further described above in conjunction with FIG. 3. The online system 140 includes the content item 425 and the combination of the likelihood of the viewing user 430 performing the interaction identified by the objective included in the content item 425 (or expected value to the online system 140 of presenting the content item 425) and the measure of similarity between the embedding of the viewing user 430 and the embedding 420 for the content item 425 including the objective identifying the interaction in one or more selection processes 435, which select content for presentation to the viewing user 430, as further described above in conjunction with FIG. 3.

CONCLUSION

The foregoing description of the embodiments has been presented for the purpose of illustration; it is not intended to be exhaustive or to limit the patent rights to the precise forms disclosed. Persons skilled in the relevant art can appreciate that many modifications and variations are possible in light of the above disclosure.

Some portions of this description describe the embodiments in terms of algorithms and symbolic representations of operations on information. These algorithmic descriptions and representations are commonly used by those skilled in the data processing arts to convey the substance of their work effectively to others skilled in the art. These operations, while described functionally, computationally, or logically, are understood to be implemented by computer programs or equivalent electrical circuits, microcode, or the like. Furthermore, it has also proven convenient at times, to refer to these arrangements of operations as modules, without loss of generality. The described operations and their associated modules may be embodied in software, firmware, hardware, or any combinations thereof.

Any of the steps, operations, or processes described herein may be performed or implemented with one or more hardware or software modules, alone or in combination with other devices. In one embodiment, a software module is implemented with a computer program product comprising a computer-readable medium containing computer program code, which can be executed by a computer processor for performing any or all of the steps, operations, or processes described.

Embodiments may also relate to an apparatus for performing the operations herein. This apparatus may be specially constructed for the required purposes, and/or it may comprise a general-purpose computing device selectively activated or reconfigured by a computer program stored in the computer. Such a computer program may be stored in a non-transitory, tangible computer readable storage medium, or any type of media suitable for storing electronic instructions, which may be coupled to a computer system bus. Furthermore, any computing systems referred to in the specification may include a single processor or may be architectures employing multiple processor designs for increased computing capability.

Embodiments may also relate to a product that is produced by a computing process described herein. Such a product may comprise information resulting from a computing process, where the information is stored on a non-transitory, tangible computer readable storage medium and may include any embodiment of a computer program product or other data combination described herein.

Finally, the language used in the specification has been principally selected for readability and instructional purposes, and it may not have been selected to delineate or circumscribe the patent rights. It is therefore intended that the scope of the patent rights be limited not by this detailed description, but rather by any claims that issue on an application based hereon. Accordingly, the disclosure of the embodiments is intended to be illustrative, but not limiting, of the scope of the patent rights, which is set forth in the following claims.

What is claimed is:

1. A method comprising:
   obtaining information describing interactions by users of an online system with content;
   generating an embedding corresponding to each user of an online system, the embedding corresponding to a user based on interactions by the user identified by the obtained information;
   maintaining one or more models at the online system, the one or more models trained based on information about interactions performed by users after being presented with content by the online system;
   generating an embedding for each of one or more content items including objectives identifying interactions based on embeddings corresponding to the users of the online system who performed the one or more interactions described by the obtained information, an embedding of a content item of the one or more content items generated by totaling values of each dimensions of embeddings corresponding to users who performed an interaction identified by an objective included in the content item of the one or more content items and dividing a total value of each dimension by a number of users who performed the interaction identified by the objective included in the content item of the one or more content items;
   obtaining a content item at an online system for presentation to users of the online system, the obtained content item not previously presented to users of the online system and including an objective specifying a desired interaction for users to perform after being presented with the content item;
   identifying an opportunity to present content to a viewing user of the online system to whom the content item has not previously been presented;
   generating a likelihood of the viewing user interacting with the obtained content item by applying the one or more models to the content item and to characteristics of the viewing user;
   retrieving an embedding of the viewing user;
   generating a measure of similarity of the embedding of the viewing user to an embedding for a content item including an objective matching the objective specifying the desired interaction included in the obtained content item, the measure of similarity specifying a similarity of the viewing user and users who previously performed the desired interaction specified by the objective of the obtained content item that accounts for users who performed the desired interaction specified by the objective of the obtained content item without previously being presented with content items having an objective identifying the desired interaction;
   generating a combination of the likelihood and the measure of similarity;
   including the obtained content item and the combination of the likelihood and the measure of similarity in one or more selection processes selecting content for presentation to the viewing user via the identified opportunity; and
   transmitting content including the obtained content item selected by the one or more selection processes from the online system to a client device for presentation to the viewing user.

2. The method of claim 1, wherein an embedding corresponding to a user includes one or more dimensions that each have a value based on a number of times the user performed an interaction corresponding to a dimension.

3. The method of claim 2, wherein generating the measure of similarity of the embedding of the viewing user to the embedding for the content item including the objective matching the objective specifying the desired interaction included in the obtained content item including the objective identifying the interaction comprises:
  determining the measure of similarity between the embedding of the viewing user and the embedding for the content item including the objective matching the objective specifying the desired interaction included in the obtained content item including the objective specifying the desired interaction based on values of one or more dimensions of the viewing user and values of one or more dimensions of the content item including the objective matching the objective specifying the desired interaction included in the obtained content item.

4. The method of claim 1, wherein generating the combination of the likelihood and the measure of similarity comprises:
  generating a sum of the likelihood and the measure of similarity.

5. The method of claim 4, wherein generating the sum of the likelihood and the measure of similarity comprises:
  applying a weight to the measure of similarity; and
  generating a sum of the likelihood and the weighted measure of similarity.

6. The method of claim 5, wherein the weight is determined by a weighting model trained across multiple content items including objectives so a combination likelihoods of users performing interactions identified by objectives included in content items after being presented with the content items and measures of similarity between embeddings of users and embeddings for content items including objectives identifying interactions is maximized.

7. The method of claim 1, wherein the obtained content item includes a bid amount specifying an amount of monetary compensation received by the online system in response to the viewing user performing the desired interaction specified by the objective included in the obtained content item after being presented with the obtained content item.

8. The method of claim 7, wherein generating a likelihood of the viewing user interacting with the obtained content item by applying the one or more models to the obtained content item and to characteristics of the viewing user comprises:
  determining an expected value to the online system of presenting the obtained content item to the viewing user based on the likelihood of the viewing user interacting with the obtained content item and the bid amount.

9. The method of claim 8, wherein the expected value comprises a product of the likelihood of the viewing user interacting with the content item and the bid amount.

10. The method of claim 1, wherein obtaining information describing interactions by users of the online system with content comprises:
  receiving information tracking mechanisms included in content presented to users of the online system by one or more sources external to the online system identifying one or more interactions with the content and identifying one or more users of the online system who performed the one or more interactions.

11. A computer program product comprising a non-transitory computer readable medium having instructions encoded thereon that, when executed by a processor, cause the processor to:
  obtain information describing interactions by users of an online system with content;
  generate an embedding corresponding to each user of an online system, the embedding corresponding to a user based on interactions by the user identified by the obtained information;
  maintain one or more models at the online system, the one or more models processes trained based on information identifying interactions performed by users after being presented with content by the online system;
  generate an embedding for each of one or more interactions based on embeddings corresponding to the users of the online system who performed the one or more interactions described by the obtained information, an embedding of a content item of the one or more content items generated by totaling values of each dimensions of embeddings corresponding to users who performed an interaction identified by an objective included in the content item of the one or more content items and dividing a total value of each dimension by a number of users who performed the interaction identified by the objective included in the content item of the one or more content items;
  obtain a content item at an online system for presentation to users of the online system, the obtained content item not previously presented to users of the online system and including an objective specifying a desired interaction for users to perform after being presented with the content item;
  identify an opportunity to present content to a viewing user of the online system to whom the content item has not previously been presented;
  generate a likelihood of the viewing user interacting with the obtained content item by applying the one or more models to the content item and to characteristics of the viewing user;
  retrieve an embedding of the viewing user;
  generate a measure of similarity of the embedding of the viewing user to an embedding for a content item including an objective matching the objective specifying the desired interaction included in the obtained content item, the measure of similarity specifying a similarity of the viewing user and users who previously performed the desired interaction specified by the objective of the obtained content item that accounts for users who performed the desired interaction specified by the objective of the obtained content item without previously being presented with content items having an objective identifying the desired interaction;
  generate a combination of the likelihood and the measure of similarity;
  include the obtained content item and the combination of the likelihood and the measure of similarity in one or more selection processes selecting content for presentation to the viewing user via the identified opportunity; and
  transmit content included in the obtained content item selected by the one or more selection processes from the online system to a client device for presentation to the viewing user.

12. The computer program product of claim 11, wherein an embedding corresponding to a user includes one or more dimensions that each have a value based on a number of times the user performed an interaction corresponding to a dimension.

13. The computer program product of claim 12, wherein generate the measure of similarity of the embedding of the viewing user to the embedding for the content item including the objective matching the objective specifying the desired interaction included in the obtained content item including the objective specifying the desired interaction comprises:
- determine the measure of similarity between the embedding of the viewing user and the embedding for the embedding for the content item including the objective matching the objective specifying the desired interaction included in the obtained content item including the objective specifying the desired interaction based on values of one or more dimensions of the viewing user and values of one or more dimensions of the embedding for the embedding for the content item including the objective matching the objective specifying the desired interaction included in the obtained content item.

14. The computer program product of claim 11, wherein generate the combination of the likelihood and the measure of similarity comprises:
- generate a sum of the likelihood and the measure of similarity.

15. The computer program product of claim 14, wherein generate the sum of the likelihood and the measure of similarity comprises:
- apply a weight to the measure of similarity; and
- generate a sum of the likelihood and the weighted measure of similarity.

16. The computer program product of claim 15, wherein the weight is determined by a weighting model trained across multiple content items including objectives so a combination likelihoods of users performing interactions identified by objectives included in content items after being presented with the content items and measures of similarity between embeddings of users and embeddings for content items including objectives identifying interactions is maximized.

17. The computer program product of claim 11, wherein the obtained content item includes a bid amount specifying an amount of monetary compensation received by the online system in response to the viewing user performing the desired interaction specified by the objective included in the obtained content item after being presented with the obtained content item.

18. The computer program product of claim 17, wherein generate a likelihood of the viewing user interacting with the obtained content item by applying the one or more models to the content item and to characteristics of the viewing user comprises:
- determine an expected value to the online system of presenting the obtained content item to the viewing user based on the likelihood of the viewing user interacting with the obtained content item and the bid amount.

19. The computer program product of claim 18, wherein the expected value comprises a product of the likelihood of the viewing user interacting with the content item and the bid amount.

20. The computer program product of claim 11, wherein obtain information describing interactions by users of the online system with content comprises:
- receive information tracking mechanisms included in content presented to users of the online system by one or more sources external to the online system identifying one or more interactions with the content and identifying one or more users of the online system who performed the one or more interactions.

* * * * *

UNITED STATES PATENT AND TRADEMARK OFFICE
CERTIFICATE OF CORRECTION

| | | |
|---|---|---|
| PATENT NO. | : 10,943,178 B1 | Page 1 of 1 |
| APPLICATION NO. | : 15/885755 | |
| DATED | : March 9, 2021 | |
| INVENTOR(S) | : Tianshi Gao et al. | |

It is certified that error appears in the above-identified patent and that said Letters Patent is hereby corrected as shown below:

On the Title Page

Item (54) and in the Specification, Column 1, Lines 1-5, delete "PRESENSTATION" and insert -- PRESENTATION --, therefor.

Signed and Sealed this
Seventeenth Day of August, 2021

Drew Hirshfeld
*Performing the Functions and Duties of the*
*Under Secretary of Commerce for Intellectual Property and*
*Director of the United States Patent and Trademark Office*